(12) United States Patent
Trika et al.

(10) Patent No.: US 7,627,713 B2
(45) Date of Patent: Dec. 1, 2009

(54) METHOD AND APPARATUS TO MAINTAIN DATA INTEGRITY IN DISK CACHE MEMORY DURING AND AFTER PERIODS OF CACHE INACCESSIBILITY

(75) Inventors: Sanjeev N. Trika, Hillsboro, OR (US); Michael K. Eschmann, Lees Summit, MO (US); Jeanna N. Matthews, Massena, NY (US); Vasudevan Srinivasan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 502 days.

(21) Appl. No.: 11/321,434

(22) Filed: Dec. 29, 2005

(65) Prior Publication Data

US 2007/0156954 A1 Jul. 5, 2007

(51) Int. Cl.
*G06F 12/00* (2006.01)
(52) U.S. Cl. .................................... 711/113; 711/135
(58) Field of Classification Search .................. 711/113, 711/135, 138
See application file for complete search history.

(56) References Cited

U.S. PATENT DOCUMENTS

| | | | | |
|---|---|---|---|---|
| 6,725,397 | B1 * | 4/2004 | Emberty et al. | 714/24 |
| 6,820,135 | B1 * | 11/2004 | Dingman et al. | 709/246 |
| 7,130,962 | B2 * | 10/2006 | Garney | 711/113 |
| 2004/0034802 | A1 * | 2/2004 | Hamilton | 713/300 |
| 2004/0103345 | A1 * | 5/2004 | Dunstan | 714/24 |
| 2005/0108473 | A1 * | 5/2005 | Le Moal et al. | 711/113 |
| 2006/0143407 | A1 * | 6/2006 | Humlicek | 711/143 |
| 2006/0230226 | A1 * | 10/2006 | Meir et al. | 711/113 |

* cited by examiner

*Primary Examiner*—Shane M Thomas
(74) *Attorney, Agent, or Firm*—Dana B. Lemoine; Lemoine Patent Services, PLLC

(57) ABSTRACT

A volatile or nonvolatile cache memory can cache mass storage device read data and write data. The cache memory may become inaccessible, and I/O operations may go directly to the mass storage device, bypassing the cache memory. A log of write operations may be maintained to update the cache memory when it becomes available.

9 Claims, 5 Drawing Sheets

METHOD AND APPARATUS TO MAINTAIN DATA INTEGRITY IN DISK CACHE MEMORY DURING AND AFTER PERIODS OF CACHE INACCESSIBILITY

FIELD

The present invention relates generally to cache memory circuits, and more specifically to cache memory circuits used with mass storage devices.

BACKGROUND

Processing systems such as computers may include different types of subsystems that can be accessed at different speeds. For example, solid state memory devices may be accessed faster than mass storage devices such as hard disk drives. Some types of memory may be used to cache information that is read from a hard disk drive. Accessing data to be read ("read data") from or to be written ("write data") to a cache memory is generally faster than accessing the same data on a hard disk drive, and so many systems include hard disk cache memory.

Platform-based disk caches are disk caches physically outside the disk(s). On systems with platform-based disk caches, I/O to the cached disk may be requested while the disk cache is inaccessible. Data integrity is a concern when performing I/O during such periods of disk cache inaccessibility.

DESCRIPTION OF EMBODIMENTS

Figure 1:
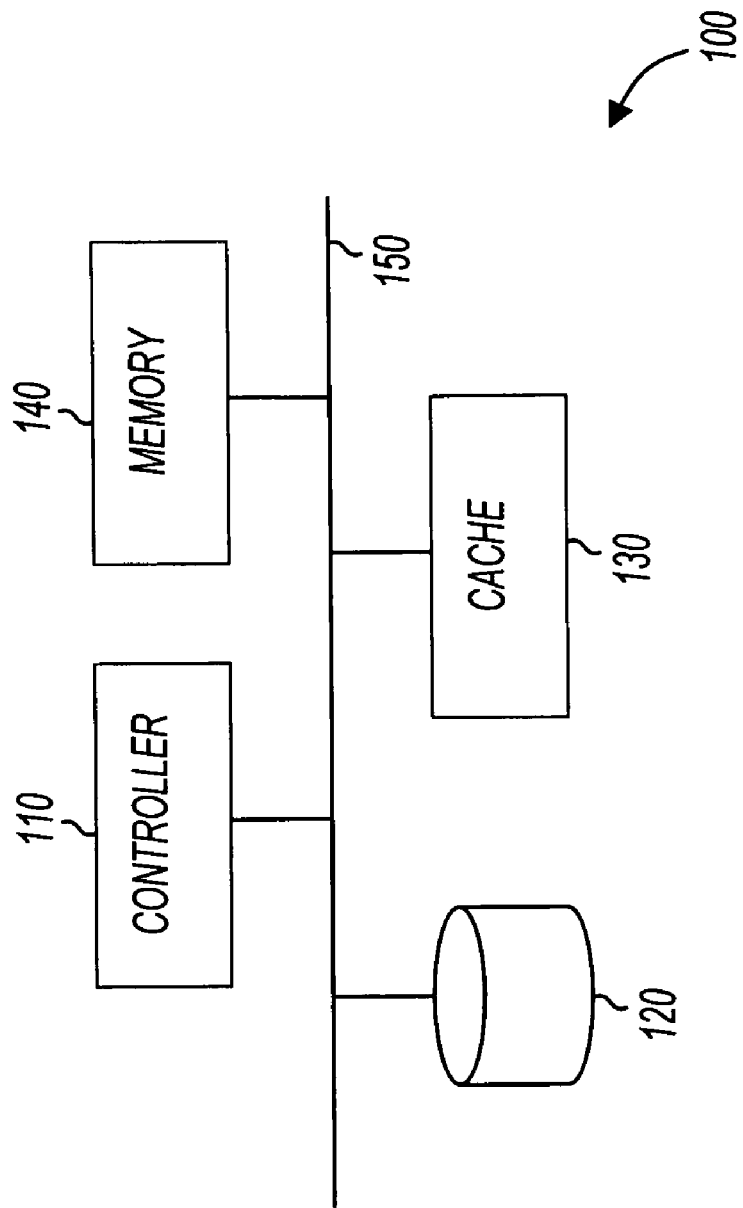
FIG. 1 shows a block diagram of an electronic system.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a block diagram of an electronic system. System 100 includes controller 110, memory 140, mass storage device 120 and cache memory 130. System 100 may include more functional blocks or subsystems than are shown in FIG. 1. For example, system 100 may include a display, power supply, wired or wireless interface, or the like. In some embodiments, controller 110 is an integrated circuit that includes many components. For example, controller 110 may include a processor, a memory controller, and an input/output (I/O) controller. Also for example, controller 110 may include multiple integrated circuits. Further, in some embodiments, controller 110 may include only a processor, I/O controller, hard disk controller, or the like.

Memory 140 represents any type of memory suitable for program or data storage. For example, memory 140 may include random access memory (RAM), dynamic random access memory (DRAM), read only memory (ROM), volatile memory such as static random access memory (SRAM), non-volatile memory such as FLASH memory, or any other type of memory. Memory 140 may also represent removable media. Further, memory 140 may represent an apparatus having a medium upon which program instructions may be stored. For example, memory 140 may store program instructions that are executable by controller 110 or by a component within controller 110.

Mass storage device 120 may be any type of mass storage device. For example, mass storage device 120 may be a hard disk drive, an optical drive, a removable magnetic media drive, a redundant array of hard disk drives, a tape drive, or any other type of mass storage device. The remainder of this description focuses on embodiments in which mass storage device 120 is a hard disk drive, but the invention is not so limited.

Cache memory 130 is used to cache read data as well as write data for mass storage device 120. Cache memory 130 may be volatile or nonvolatile, and may include any type of memory technology. For example, cache memory 130 may be nonvolatile memory such as ovonics, polymer, FLASH, battery-backed DRAM, or the like. Also for example, cache memory 130 may be volatile memory such as DRAM, SRAM, or the like. The various embodiments of the present invention are not limited by the type of memory technology utilized for cache memory 130. In some embodiments, cache memory 130 may be part of memory 140, and may be maintained across power events by writing the data to mass storage device 120 on shutdowns/hibernates, and restoring the data from there on subsequent reboot/resume. In other embodiments, cache memory 130 may be part of mass storage device 120.

Bus 150 may be any type of bus capable of providing interconnect for the various functional blocks shown in FIG. 1. Bus 150 may be a point-to-point bus, or a multi-point bus. For example, in some embodiments, bus 150 operates as a peripheral component interconnect (PCI) bus, and in some embodiments, bus 150 operates as a PCI-Express bus. Also for example, in some embodiments, bus 150 may operate as a parallel ATA bus or serial ATA bus. The type of bus utilized is not a limitation of the present invention.

In some embodiments, accesses to mass storage device 120 take longer than accesses to cache memory 130. For example, in some embodiments, mass storage device 120 may be a hard disk drive that stores data magnetically on a spinning media, and cache memory 130 may be FLASH memory having faster access times than that of the disk drive. In these embodiments, read caching may provide performance improvements when the same data is accessed more than once, and write caching may provide performance improvements when data destined for the hard disk is written in the cache without first having to be written to the hard disk. Read caching and write caching in cache memory may provide other performance improvements as well.

To aid in the description of the various embodiments of the invention, the following terms are provided:

"Cached data" is data that is located on cache memory 130;

"Clean data" is cached data that matches the contents of mass storage device 120;

"Dirty data" is cached data that does not match the contents of mass storage device 120 and for which the cached copy is correct;

"Stale data" is cached data that does not match the contents of mass storage device 120 and for which the copy on the mass storage device is correct;

A "flush operation" takes dirty data in the cache and makes it clean by writing the cached version to mass storage device 120; and An "invalidate operation" marks cached data as invalid or no longer cached.

Figure 2:
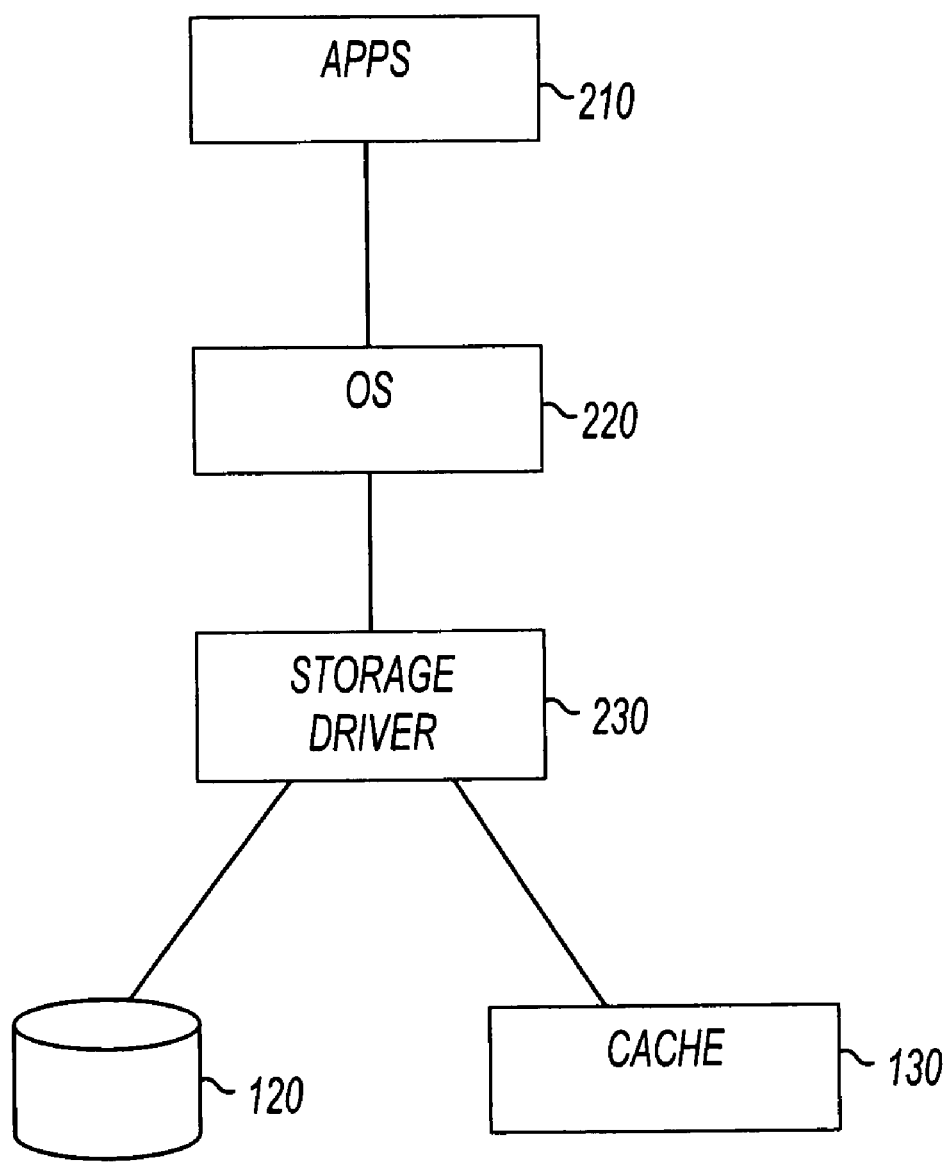
FIG. 2 shows a software architecture suitable for use with the electronic system of FIG. 1.

FIG. 2 shows a software architecture suitable for use with the electronic system of FIG. 1. FIG. 2 also shows possible interaction between the software architecture, mass storage device 120, and cache memory 130.

The software architecture includes application software (APPS) 210, operating system (OS) 220, and storage driver 230. Apps 210 may be any type of application software, and OS 220 may be any type of operating system software. For example, OS 220 may be a desktop operating system, a server operating system, a workstation operating system, a personal organizer operating system, a cellular phone operating system, or any other type of operating system. Accordingly, the methods and apparatus of the present invention may be utilized in many different hardware/software scenarios.

Storage driver 230 provides an interface between OS 220 and storage media. For example, storage driver 230 may receive requests from OS 220 to read data from, or write data to, mass storage device 120. In some embodiments of the present invention, storage driver 230 may utilize cache memory 130 for caching read data and write data. For example, when storage driver 230 receives a request to write data to mass storage device 120, storage driver 230 may cache the write data to cache memory 130. Further, storage driver 230 may coordinate the flushing of cache memory 130 to mass storage device 120.

Scenarios exist in which the operating system may request a read or write when the cache is inaccessible. For example, storage driver 230 may receive a request from OS 220 to write to mass storage device 120 while cache memory 130 is either powered down, or not available on bus 150 (FIG. 1). In these scenarios, storage driver 230 determines what to do with the request made by the operating system.

As described in the previous paragraph, the cache memory may be inaccessible. Example scenarios include hibernation, system crash, and boot pre-driver-load. During hibernation, various subsystems may be turned off in sequence. For example, the disk cache may be shut down prior to the hard disk being shut down, and the OS may still request a write. During a system crash, the operating system may provide notice to the storage driver that the system is going to crash. During boot pre-driver-load prior to loading the storage driver, the system may choose not to use the cache even though it may be possible using lower level software. A cache may become inaccessible for many different reasons, and the various embodiments of the present invention are not limited to the examples provided.

Storage driver 230 may receive a "cache inaccessibility notification" that indicates future inaccessibility of cache memory 130. For example, OS 220 may send a start message in the orthogonal crash driver context during an impending system crash. Depending on the severity of the crash, the cache may or may not be available for caching hard disk reads and writes. Cache 130 can then be queried to determine if the cache is available or not. Also for example, OS 220 may send a cache inaccessibility notification to signal future cache inaccessibility during a change in system state, such as standby, hibernation, or other system state in which the cache is inaccessible. Cache inaccessibility notifications may be utilized whenever the cache is to be inaccessible, and are not limited to the examples provided above.

A cache may become inaccessible without storage driver 230 receiving a cache inaccessibility notification. For example, the cache memory may become inaccessible because at some stage the system simply prefers not to access the cache.

Various embodiments of the present invention determine whether the cache memory is accessible or inaccessible, and then respond accordingly. For example, a range of embodiments ensure that crash-time and hibernate-time disk writes do not result in stale data in the cache, thus ensuring data integrity. Appropriate embodiments may be determined for a given implementation based on many factors, including for example, whether the disk and the cache device are powered and accessible during crash/hibernation processing. At some stages of the crash/hibernation processing, the disk caching logic may also be running in a limited environment (e.g. less memory available, run-time memory structures inaccessible, etc.), which limits the ability to implement a complex caching policy. Four embodiments are now described numbered one through four. These embodiments are not mutually exclusive. For example, features from one described embodiment may be included with features from a separately described embodiment without departing from the scope of the present invention.

1. Full Caching (Reads and Writes to Disk and Cache Device as Normal)

Any I/O during crash/hibernation is handled using normal caching operations and policies. In particular, reads to dirty data are satisfied from the cache. The caching policy may be simplified in a compatible manner, for example, by not performing further insertions for reads and/or writes.

This full caching embodiment may be utilized when the disk and cache device are both accessible and powered, and the system is able to implement at least simplified caching policies. For example, a cache inaccessibility notification may provide enough notice to the storage driver so that full caching may be performed for at least part of the time between receiving the notification and the cache becoming inaccessible.

Full caching may be a desirable option in part because it provides good performance during the change in system state (e.g., crash or hibernation) as well as during the subsequent restoration of system state (e.g., reboot or resume), with minimum additional complexity and special case handling. For example, full caching may be a preferred embodiment for use in hybrid drives that include non-volatile disk caching, where the cache and disk drive are powered down at roughly the same time during a change in system state.

2. Clean the Cache with a Full Flush, and Keep it Clean Using Immediate Cache-line Invalidation on Write.

In these embodiments, all dirty data is flushed from the cache if possible upon determination of cache inaccessibility, or as part of the actual crash/hibernation/inaccessibility handling. Further reads are satisfied from the disk, thus eliminating the need for complex caching algorithms during processing of the crash/hibernation. Further writes are also satisfied from the disk, and a check is made to determine whether the data exists in the cache, and invalidate it if so. When cache data is invalidated, memory structures that indicate what is cached are updated, or the memory structures are restored from the cached device on recovery.

In these embodiments, both the disk and cache device are powered and accessible during all stages of hibernation and crash. Further, in these embodiments, the caching policy is much simpler than in normal operation (only flush and invalidate operations go to the cache device).

3. Clean the Cache with a Full Flush. Allow Stale Data While the Cache is Inaccessible. Log Writes to Cache Device or Disk. Invalidate/Update Stale Data during Subsequent Reboot/Resume/Cache Accessibility.

This embodiment is the most complex of the numbered embodiments described, and is also described below in pseudo-code. Upon determination of cache inaccessibility, all dirty data is flushed from the cache if possible. This could be, for example, during a crash/hibernation notification event, or as part of the actual crash/hibernation/inaccessibility handling. Reads during the period of cache inaccessibility go to the disk without caching the read data. The writes also go to the disk without caching write data, and a log is kept of the writes performed so that any stale data in the cache can be invalidated when the cache next becomes accessible. The log is referred to herein as a "cache synchronization log." As described above, the various embodiments of the present invention are not limited to system crashes and hibernation events.

Note that if the cache synchronization log is limited in size, a marker (bit/value/range/string) may be maintained in the log to indicate that more than a maximum number of writes occurred, and in that case the entire cache may be invalidated by the storage firmware/driver/controller. The cache synchronization log may be stored on the cache or the disk, and processed during the subsequent reboot/resume/cache accessibility. This includes reflecting the invalidates in the memory metadata structures. The cache synchronization log has a location known to both the storage driver/firmware/controller and the reboot/resume firmware. This location may be fixed, or information about the location may be pre-stored in the disk cache.

In some embodiments, when a sector-write is requested by the OS during cache inaccessibility, a check is performed to determine if that sector is in the cache (this check can be performed with data in memory 140), and add it to the cache synchronization log only if the check succeeds.

Note that if the cache synchronization log is stored on the disk, then it may be placed in any sector(s) that is/are present in the cache; e.g., sector 0 can be marked as permanently cached and sector 0 can be always used for storing the cache synchronization log. A write log identification number/string may also be written to sector 0 to detect whether or not OS writes to sector 0 happened during the crash/hibernation, in which case the cache may be reset during the reboot/resume. Note also that whenever the cache synchronization log is used, a flush of dirty data is performed prior to recording disk writes in the log because the metadata structures that determine whether something is a read hit or not will not reflect invalidates and may cause a read of stale data.

Both the cache and the disk must be accessible and powered during the flush. If the cache synchronization log is written to the cache device, the two must also be accessible and powered post-flush. However, if the cache synchronization log is written to the disk, then the cache device may be off post-flush.

In alternate embodiments, the cache flush may be done only if the cache synchronization log overflows. In these embodiments, the reads may be satisfied from the cache whenever possible.

The following pseudo-code describes processing associated with receiving a cache inaccessibility notification, processing write requests, and reboot/resume during hibernation, when the disk cache cannot be accessed. This example illustration uses sector 0 of the cached device as the location for the cache synchronization log. A write log identification string of "synch-log" is stored as the last 9 bytes in sector 0 to indicate the intent of this sector. In some embodiments, sector 0 may include a pointer to point to the cache synchronization log, which is kept elsewhere. In this example, the cache synchronization log is limited to 10 entries, and sector 0 is always cached. The specific constants (e.g., size of the cache synchronization log) in this example are used for readability and understandability only, and may be parameterized. System crashes and other instances of cache inaccessibility may be similarly handled.

```
Procedure OnCacheInaccessibilityNotification
    Ensure sector 0 is cached; /log will be kept on sector 0 of
        disk
    Mark the fact that the system is going into hibernation in
        the disk cache;
    Flush the disk cache; /start with all clean cache data
    Write write log identification string "synch-log" as the last
        bytes in sector 0 on disk; /used to detect log overflow
    Mark sector 0 as dirty in the disk cache; /sector 0 will be
        restored on reboot/resume
    NumEntriesInLog=0;
    Sector0IsLog=true;
End Procedure
Procedure OnWritesDuringActualHibernation (SectorAddress, DataToWrite)
    NumEntriesInLog++; /one entry will be added to log
    If (SectorAddress==0) then /OS is writing sector 0—can't
        use for log Sector0IsLog=false;
        Copy Sector0 from the disk cache to the disk;
    End if
    If (Sector0IsLog) then
        Write NumEntriesInLog to dword 0 on sector 0 of the
            cached disk; /track the number of log entries
        If (NumEntriesInLog<=10) then
            Write SectorAddress to dword NumEntriesInLog on
                sector 0 of the cached disk; /track the sectors that
                are written
        End if
    End if
    Write DataToWrite to SectorAddress on the cached disk;
End Procedure
Procedure FirmwareLogicOnResumeAfterHibernate
    If (the disk cache is marked that the system hibernated)
        then
    Read Sector0 from disk
    If (Sector0's last bytes are the write log identification string
        "synch-log") then/not corrupted
        N=sector0.dword0;
        If (N>10) then/overflowed
            Reset/invalidate the cache, or mark it for such action
                by the storage driver; /too many writes occurred
                after cache inaccessibility
        Else
            Invalidate any cache entries that correspond to the N
                dwords from sector 0, starting at dword 1;
        End if
        Copy Sector0 from the disk cache to the disk;
```

Else/write log identification string is overwritten, signifying log is corrupt or overflowed
Reset/invalidate the cache, or mark it for such action by the storage driver;
End if
End if
End Procedure 4. Flush Cache. Send Writes and Reads to Disk Invalidate Cache on Reboot/Resume.

Upon determining cache inaccessibility, all dirty data is flushed from the cache. This could be, for example, during a crash/hibernation notification event, or as part of the actual crash/hibernation/inaccessibility handling. Further reads and writes during periods of cache inaccessibility are satisfied from the disk. The entire cache is invalidated during the subsequent reboot/resume. The invalidation/reset may also happen upon determining cache inaccessibility, in which case caching is turned off immediately after the invalidation, and turned back on during the next boot/resume or when the cache becomes accessible. This embodiment may be useful when the cache is accessible and powered through the flush, and inaccessible after that, and a simple approach is preferred.

In some embodiments, separate elements of the four above described embodiments are combined in a system. For example, in some embodiments, crash handling may use one embodiment, and hibernation may use another embodiment. A system may use any number of embodiments in combination for various types of system state changes without departing from the scope of the present invention.

One solution for a Microsoft Windows XP based computer having an external disk cache on a mini-PCI-[express] bus may be as follows:

(a) For crash handling, both the disk drive and the cache are accessible, and any of the numbered embodiments listed above may be utilized. For example, a simple embodiment, such as #2, above, may be utilized for crash handling. Since Windows XP doesn't include read entry-points for crash/hibernation mini-kernels, the flush during crash/hibernation may be skipped, relying on firmware to do the same on the subsequent reboot/resume.

(b) For hibernation handling, embodiment #3, above, may be utilized. The OS provides a pre-notification (a power management event) during which both the disk cache and the disk are accessible, and the flush can be performed. After the flush, the system begins the actual hibernation during which time the cache is not accessible, and disk writes are logged to sector 0 on the hard disk.

Figure 3:
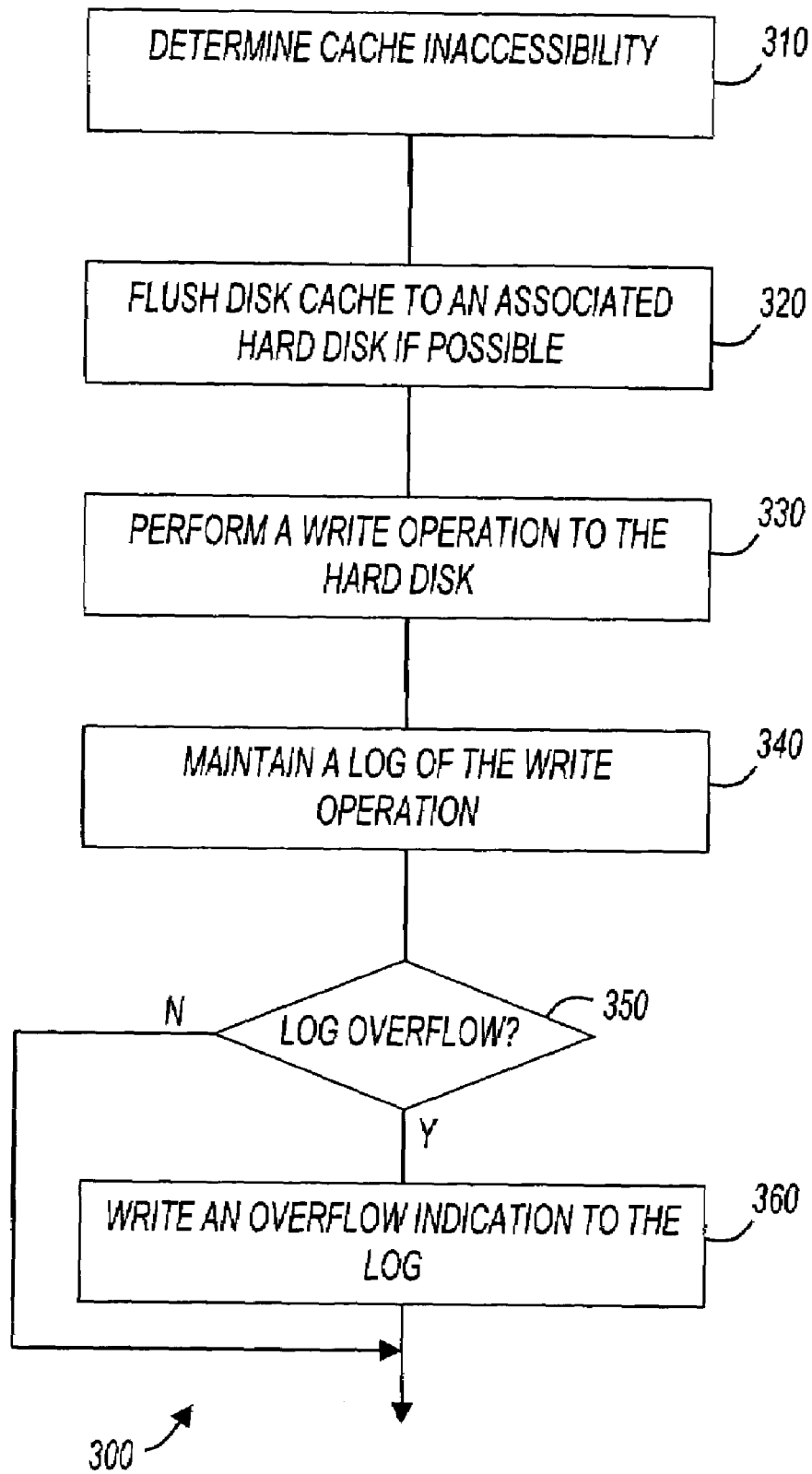
FIGS. 3 and 4 show flowcharts in accordance with various embodiments of the present invention.

FIG. 3 shows a flowchart in accordance with various embodiments of the present invention. In some embodiments, method 300, or portions thereof, is performed by a storage controller or a processor, embodiments of which are shown in the various figures. In other embodiments, method 300 is performed by an integrated circuit, a system on a chip, or an electronic system. Method 300 is not limited by the particular type of apparatus or software element performing the method. The various actions in method 300 may be performed in the order presented, or may be performed in a different order. Further, in some embodiments, some actions listed in FIG. 3 are omitted from method 300.

Method 300 is shown beginning with block 310. At 310, cache inaccessibility is determined. In some embodiments, cache inaccessibility is determined when a cache inaccessibility notification is received. For example, this may correspond to a storage driver receiving a notification of an impending change of system state, such as a system crash or hibernation event. In other embodiments, cache inaccessibility is determined by querying the cache to determine its state, or by choosing to declare the cache inaccessible.

At 320, a disk cache is flushed to a hard disk if possible. For example, a flush may be conditionally performed based on whether the disk cache is currently accessible.

At 330, a write operation is performed to the hard disk. In some embodiments, the write operation is performed by a storage driver in response to a request by an operating system. At 340, a log of the write operation is maintained. In some embodiments, the log is maintained on the hard disk. Further, in some embodiments, the log is maintained on the disk cache.

At 350, a determination is made whether the log overflowed. In some embodiments, this is performed by simply counting the number of log entries. For example, the procedure OnWritesDuringActualHibernation described above counts the number of log entries, and if the number becomes larger than ten, then an overflow has occurred. Logs can be any size, and are not limited to ten entries.

At 360, an overflow indication is written to the log if the actions of 350 determined that an overflow occurred. An overflow indication may be written by incrementing the number of log entries beyond the point at which an overflow occurs, without physically overflowing the log. For example, the procedure OnWritesDuringActualHibernation described above increments the number of log entries past ten to indicate a log overflow without continuing to write to the log. In other embodiments, overflow indications may be written by setting a flag, overwriting a write log identification string, or the like.

The actions of method 300 may be performed by one software procedure or may be split among multiple software procedures. For example, the cache may be flushed by a procedure that responds to the cache inaccessibility notification, and the writes to the hard disk may be performed by a procedure that responds to I/O requests made by an operating system.

Figure 4:
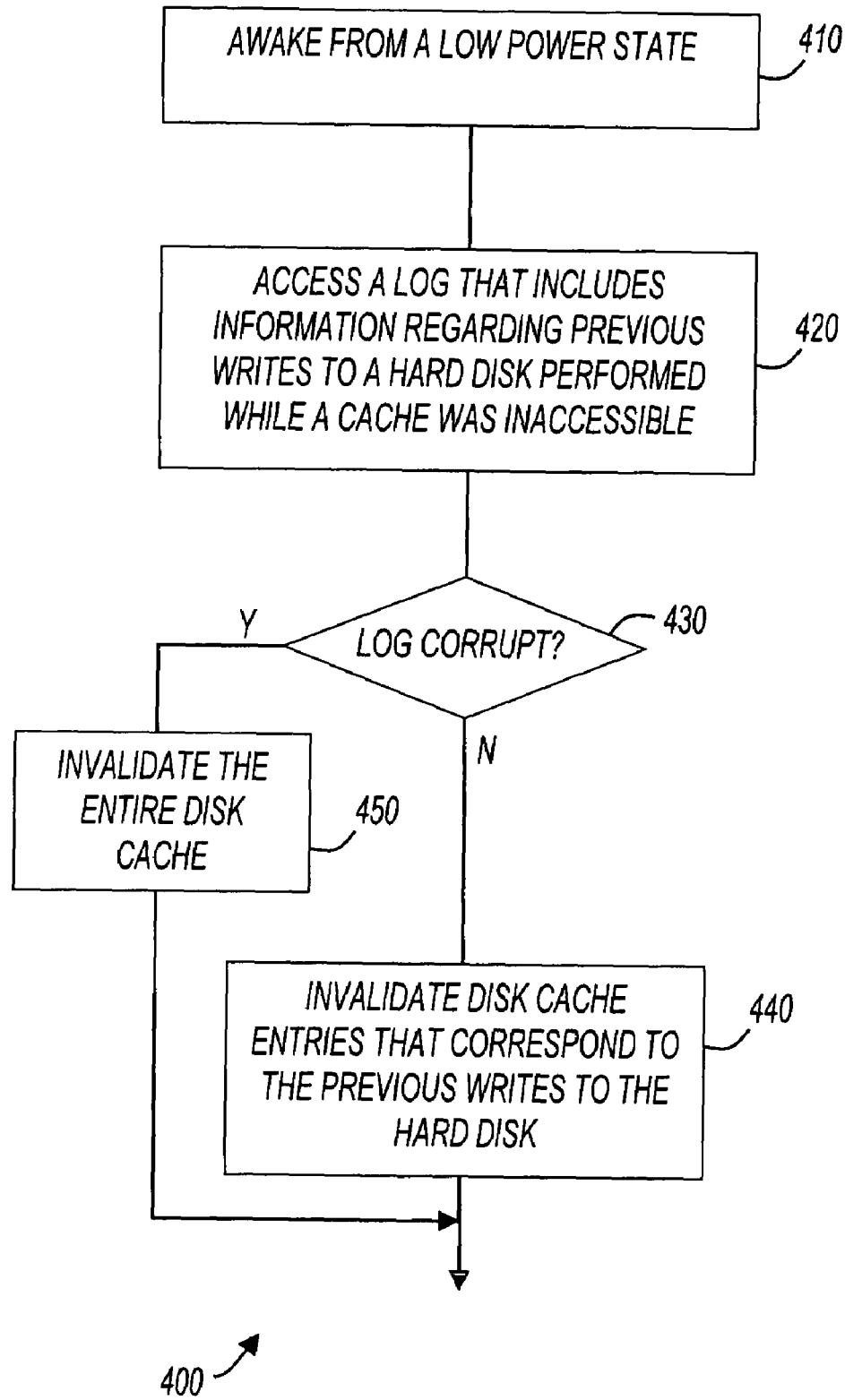

FIG. 4 shows a flowchart in accordance with various embodiments of the present invention. In some embodiments, method 400, or portions thereof, is performed by a storage controller or a processor, embodiments of which are shown in the various figures. In other embodiments, method 400 is performed by an integrated circuit, a system on a chip, or an electronic system. Method 400 is not limited by the particular type of apparatus or software element performing the method. The various actions in method 400 may be performed in the order presented, or may be performed in a different order. Further, in some embodiments, some actions listed in FIG. 4 are omitted from method 400.

Method 400 is shown beginning with block 410. At 410, the apparatus performing the method awakes from a low power state. For example, a system may boot up from a power off state, or may resume from a hibernation state. When entering the low power state, a log file may have been created to log writes to a hard disk that bypassed a disk cache while the cache was inaccessible.

At 420, a log is accessed that includes information regarding previous writes to a hard disk performed while a cache was inaccessible. At 430, a determination is made whether the log is corrupt. In some embodiments, this corresponds to a log overflow condition as described above with reference to FIG. 3. For example, a log may be considered corrupt when a number of log entries exceeds a threshold.

Also in some embodiments, a log may be considered corrupt when the log is overwritten. For example, an operating system may write to a disk sector that includes the log, and may corrupt the log as a result. This may be detected by examining the log to determine whether it has been partially or completely overwritten.

If the log is found to be corrupt, the entire cache is invalidated at 450. If the log is not corrupt, disk cache entries that correspond to the previous writes to the hard disk are invalidated at 440. This invalidates any cache data that became stale as a result of the disk writes while the cache was inaccessible.

Figure 5:
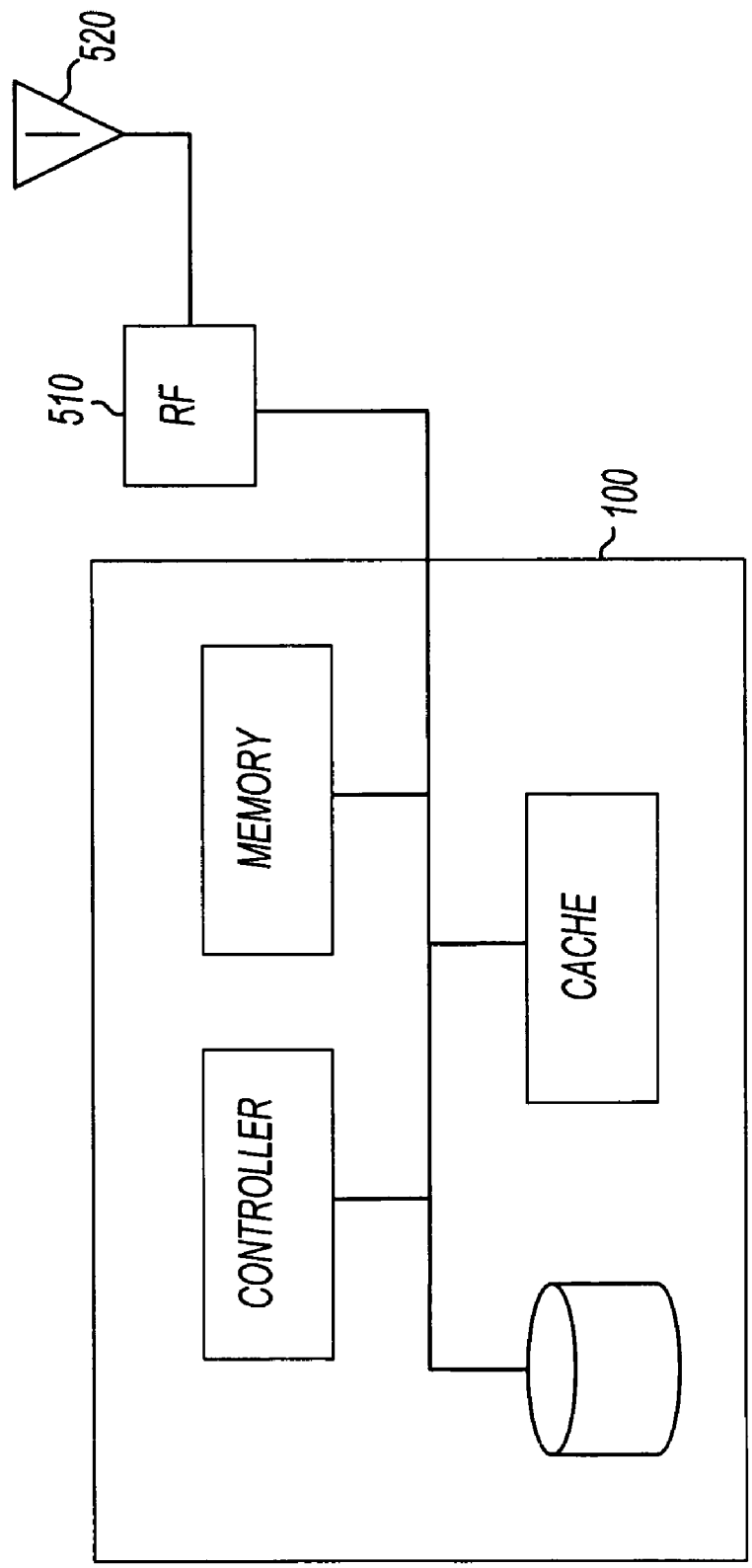
FIG. 5 shows a system diagram in accordance with various embodiments of the present invention.

FIG. 5 shows a system diagram in accordance with various embodiments of the present invention. FIG. 5 shows system 500 including the system 100 of FIG. 1, radio frequency (RF) circuits 510, and antenna 520. System 100 is shown and described with reference to previous figures. System 100 includes a cache capable of caching read data and write data for a mass storage device such as a hard disk. System 100 also includes a storage driver component such as storage driver 230 (FIG. 2) to perform the caching operations. The storage driver may maintain a log of disk writes during periods of cache inaccessibility, and may also update the cache or invalidate the cache in accordance with embodiments previously described.

Example systems represented by FIG. 5 include cellular phones, personal digital assistants, wireless local area network interfaces, and the like. Many other system uses exist for mass storage cache memory. For example, cache memory may be used in a desktop computer, a laptop computer, a network bridge or router, or any other system with or without an antenna.

RF circuits 510 may include amplifiers, modulators, demodulators, and other signal processing circuits. In operation, RF circuits 510 receive communications signals from antenna 520, and provide digital signals to system 100 for processing. For ease of illustration, frequency conversion, demodulation, analog-to-digital conversion, and other signal processing is not shown. In some embodiments, RF circuits 510 may include a heterodyne receiver, and in other embodiments, RF circuits 510 may include a direct conversion receiver. In some embodiments, RF circuits 510 may include multiple receivers. For example, in embodiments with multiple antennas 520, each antenna may be coupled to a corresponding receiver.

RF circuits 510 may be adapted to receive and demodulate signals of various formats and at various frequencies. For example, RF circuits 510 may be adapted to receive time domain multiple access (TDMA) signals, code domain multiple access (CDMA) signals, global system for mobile communications (GSM) signals, orthogonal frequency division multiplexing (OFDM) signals, multiple-input-multiple-output (MIMO) signals, spatial-division multiple access (SDMA) signals, or any other type of communications signals. The various embodiments of the present invention are not limited in this regard.

Antenna 520 may include one or more antennas. For example, antenna 520 may include a single directional antenna or an omni-directional antenna. As used herein, the term omni-directional antenna refers to any antenna having a substantially uniform pattern in at least one plane. For example, in some embodiments, antenna 520 may include a single omni-directional antenna such as a dipole antenna, or a quarter wave antenna. Also for example, in some embodiments, antenna 520 may include a single directional antenna such as a parabolic dish antenna or a Yagi antenna. In still further embodiments, antenna 520 includes multiple physical antennas. For example, in some embodiments, multiple antennas are utilized for multiple-input-multiple-output (MIMO) processing or spatial-division multiple access (SDMA) processing.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   receiving a cache inaccessibility notification signifying future inaccessibility of a disk cache during a time in which a hard disk will still be accessible;
   flushing the disk cache to the hard disk;
   receiving a write request from an operating system during the time in which the disk cache is inaccessible and the hard disk is accessible;
   performing a write operation to the hard disk, creating stale data in the disk cache;
   maintaining a log of the write operation to keep track of the stale data; and
   invalidating the stale data in the disk cache when the disk cache becomes accessible;
   wherein determining cache inaccessibility comprises receiving a cache inaccessibility notification signifying a change in system state, and wherein the cache inaccessibility notification signifies that a system is entering hibernation.

2. The method of claim 1 wherein maintaining a log of the write operation comprises storing a hard disk sector number.

3. A method comprising:
   receiving a cache inaccessibility notification signifying future inaccessibility of a disk cache during a time in which a hard disk will still be accessible;
   flushing the disk cache to the hard disk;
   receiving a write request from an operating system during the time in which the disk cache is inaccessible and the hard disk is accessible;
   performing a write operation to the hard disk, creating stale data in the disk cache;
   maintaining a log of the write operation to keep track of the stale data; and
   invalidating the stale data in the disk cache when the disk cache becomes accessible;
   wherein maintaining a log of the write operation comprises maintaining a log on the hard disk.

4. The method of claim 3 further comprising writing an overflow indication to the log.

5. A computer-readable medium having instructions stored thereon that when executed result in the computer performing:
   detecting a future cache inaccessibility situation, flushing a disk cache to a hard disk, receiving an operating system write request after the disk cache is inaccessible, performing a write operation to the hard disk creating stale data in the disk cache, maintaining a log of the write operation to keep track of the stale data, and invalidating the stale data in the disk cache when the disk cache becomes accessible, wherein maintaining a log of the write operation comprises maintaining a log on the hard disk.

6. The computer-readable medium of claim 5 wherein the instructions when executed further result in the computer performing writing an overflow indication to the log.

7. A system comprising:
   a processor;
   a radio frequency circuit coupled to the processor;
   a hard disk coupled to the processor;
   a hard disk cache coupled to the processor; and
   a storage driver component to maintain a log of writes made to the hard disk during periods of hard disk cache inaccessibility and to later interpret the log and invalidate stale data in the hard disk cache created by the writes, wherein the log of writes is maintained on the hard disk.

8. The system of claim 7 further comprising a storage driver component to update the hard disk cache using information in the log.

9. A storage driver computer program product comprising:
a computer-readable medium having stored thereon computer-executable instructions that when executed cause a computer to maintain a log of writes made to a hard disk during periods of hard disk cache inaccessibility and to later interpret the log and invalidate stale data in the hard disk cache created by the writes;
wherein the computer-executable instructions further cause the computer to write an overflow indication to the log, and wherein the computer-executable instructions further cause the computer to invalidate the entire hard disk cache if an overflow indication is found in the log.

* * * * *